United States Patent
Grossman

(10) Patent No.: US 7,644,033 B2
(45) Date of Patent: Jan. 5, 2010

(54) METHOD AND SYSTEM FOR TRADING FINANCIAL INSTRUMENTS

(75) Inventor: Karl Grossman, Tokyo (JP)

(73) Assignee: Barclays Capital Inc., New York, NY (US)

(*) Notice: Subject to any disclaimer, the term of this patent is extended or adjusted under 35 U.S.C. 154(b) by 0 days.

(21) Appl. No.: 11/638,341

(22) Filed: Dec. 13, 2006

(65) Prior Publication Data

US 2008/0222050 A1    Sep. 11, 2008

Related U.S. Application Data

(60) Provisional application No. 60/750,275, filed on Dec. 13, 2005.

(51) Int. Cl.
*G06Q 40/00* (2006.01)

(52) U.S. Cl. ........................ 705/37; 705/36 R
(58) Field of Classification Search .................. None
See application file for complete search history.

(56) References Cited

U.S. PATENT DOCUMENTS

| | | | |
|---|---|---|---|
| 6,618,707 B1 * | 9/2003 | Gary | 705/36 R |
| 7,246,093 B1 * | 7/2007 | Katz | 705/37 |
| 7,319,971 B2 * | 1/2008 | Abrahams et al. | 705/7 |
| 7,389,263 B2 * | 6/2008 | Gladstone | 705/37 |
| 2002/0004776 A1 * | 1/2002 | Gladstone | 705/37 |
| 2002/0138299 A1 | 9/2002 | Nations | |
| 2003/0110113 A1 | 6/2003 | Martin | |
| 2003/0130929 A1 | 7/2003 | Waddell | |
| 2003/0135437 A1 * | 7/2003 | Jacobsen | 705/35 |
| 2004/0236667 A1 * | 11/2004 | Cotton | 705/37 |
| 2004/0254874 A1 | 12/2004 | Bok et al. | |
| 2007/0156563 A1 * | 7/2007 | McGill | 705/36 R |
| 2008/0177676 A1 * | 7/2008 | Weber et al. | 705/36 R |

OTHER PUBLICATIONS

Celarier, M., "The Multiplier EffectHedge Funds of Funds are Piling on the Leverage; Will It End in Tears?", The Investment Dealers' Digest: IDD. New York: Sep. 20, 2004, p. 1.*
Luciano, E., et al., "A Value at Risk Approach to Background Risk", Geneva Papers on Risk and Insurance Theory., Sep. 2001, vol. 26, Iss. 2, p. 9.*
International Search Report and Written Opinion; International Application No. PCT/US06/47588; International Filing Date: Dec. 13, 2006; 6 pages.

* cited by examiner

*Primary Examiner*—Hani Kazimi
*Assistant Examiner*—Olabode Akintola
(74) *Attorney, Agent, or Firm*—Morgan, Lewis & Bockius LLP

(57) ABSTRACT

Tranches of a position in a financial instrument held by an entity are traded. A suitable tranche size to be traded in a financial market is determined. A trade size of a tranche to trade in the financial market is also determined. The trade size comprises a smaller of a size of the position and the suitable tranche size. An effect of executing a tranche of a size comprising the trade size on an absolute dollar value of risk associated with a portfolio of the entity is determined. The tranche is placed in the market for execution if the absolute dollar value of risk remains the same or is reduced by executing the tranche.

5 Claims, 2 Drawing Sheets

METHOD AND SYSTEM FOR TRADING FINANCIAL INSTRUMENTS

FIELD OF THE INVENTION

The present invention relates to trading financial instruments.

BACKGROUND OF THE INVENTION

Market makers typically execute client trades on an agency basis, meaning that the market maker trades on behalf of a client, who will finally pay, and receive, the price the market maker achieved. However, a market maker might also execute client trades on a risk basis. In this instance, the market maker himself will trade as counterparty against the client and, as a result, will have a long or short position. These risk positions are generally unwanted by the market maker and his objective is to unwind these at minimal absolute cost (referred to as "target strike or better").

SUMMARY OF THE INVENTION

The present invention is directed to a system and method for trading tranches of a position in a financial instrument held by an entity. A suitable tranche size to be traded in a financial market is determined. A trade size of a tranche to trade in the financial market is also determined. The trade size of the tranche comprises a smaller of a size of the position and the suitable tranche size. An effect of executing a tranche of a size comprising the trade size on an absolute dollar value of risk associated with a portfolio of the entity is determined. The tranche is placed in the market for execution if the absolute dollar value of risk remains the same or is reduced by executing the tranche.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

The system and method described herein present an automated risk unwind engine, including position-induced trading and self-hedging optimized trade out features.

First described is position-induced trading. Engines used in connection with automatic trading typically receive orders, which specify the instrument, trading direction, quantity and any other additional trading instructions (e.g., price limits). Exchanges typically support only a very limited range of basic order types, the most prevalent being limit orders (i.e., an order to buy a specified quantity of a security at or below a specified price, or to sell it at or above a specified price).

Auto-trading engines are used to implement more complex order-types and trading strategies. Orders sent to these engines are called parent orders. The engines autonomously split the parent order into child-orders of the simple type supported by exchanges. Sending a parent order typically requires a knowledgeable human operator who enters orders into a trading system and later monitors and amends these as the situation changes. If, for example, stock was acquired off-exchange while an order is outstanding, the human operator would need to amend the quantity of the outstanding parent order to reflect the off-exchange trade.

Figure 2:
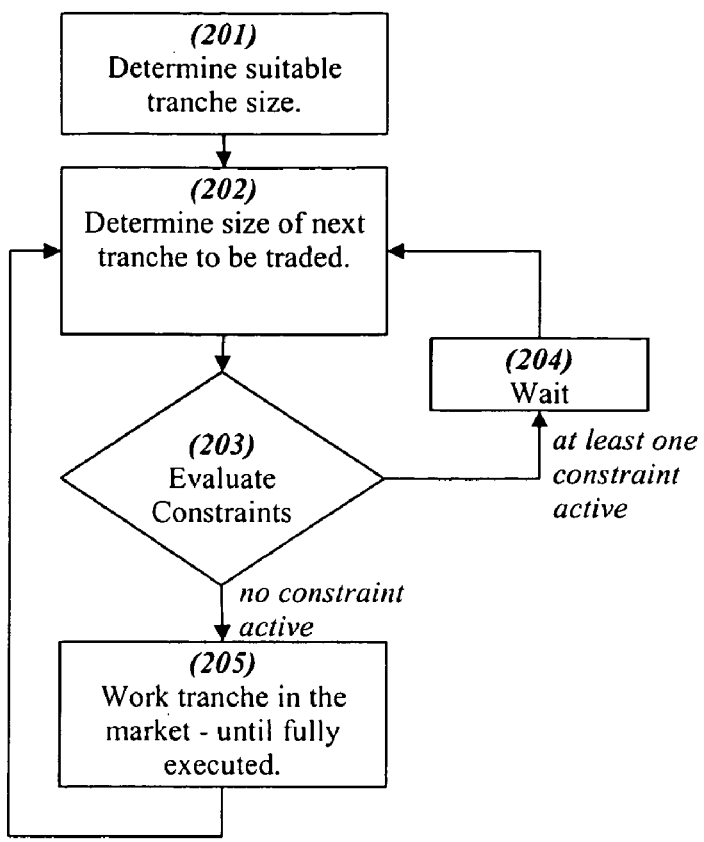
FIG. 2 is a flow diagram illustrating a preferred embodiment of a method of the present invention.

The system of the present invention, however, does not rely on parent orders. Instead, the engine monitors positions in a position-keeping system and then works to reduce these to zero by directly placing orders in the market. An example of a position-keeping system is a table that stores the number of shares currently owned for any given stock. Position-keeping systems for trading purposes are kept up-to-date in real-time, and reflect any change in position instantaneously. Positions typically change as a result of trading activity, including on-exchange trades, off-exchange trades against clients or other counterparties, as well as share transfers from other internal accounts. If a human operator places orders in the market to unwind positions, the operator will have to update outstanding orders whenever positions change. An automated unwind engine eliminates the need for parent orders, and automates the task of position-management. One way in which the engine may accomplish this is described below with reference to FIG. 2.

This approach has a number of advantages over an order-driven system. First, there is no need for a knowledgeable human operator, given that the necessary orders are now placed and monitored by the engine. Market makers using the system only need to book trades into the position-keeping system to invoke the engine, something they would do in any event. Second, any changes in the firm's positions are immediately taken account of, without the need to cancel or amend existing orders, in view of the fact that the engine monitors all positions and initiates any necessary amendments to its outstanding orders, to ensure that positions are, indeed, decreasing to zero. Especially when trading risk, the firm's position changes frequently as market makers try to attract crosses (i.e., offsetting business to existing positions). The system also eliminates the need for a crossing engine, as trades will implicitly cross in the position-keeping system.

Figure 1:
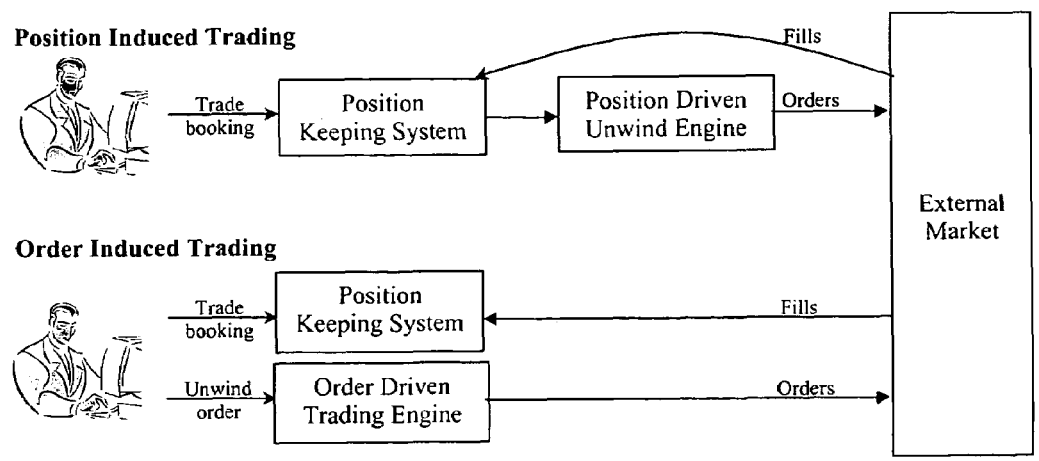
FIG. 1 is a diagram illustrating a preferred embodiment of a system of the present invention.

FIG. 1 illustrates the differences between position induced trading and order induced trading. When performing a risk trade, a trader must book the trade, as a first step, into a position-keeping system. As a second step ("order induced trading"), the trader would review the resulting position, compare it against outstanding orders in the market, and then cancel, replace or create orders to unwind the current positions. "Position induced trading" eliminates the second step, as this is now done automatically by an engine.

Next described is self-hedging optimized trade-out. Any instrument typically carries two types of risk: a) systematic risk, i.e., the risk of the overall market and sector risk, and b) unsystematic or idiosyncratic risk, which is risk specific to an instrument. The only way to reduce or eliminate instrument-specific risk is to trade-out as quickly as possible. However, market and sector risk can be reduced via hedging, i.e., by holding risk offsetting positions in other instruments. As any trading activity typically results in trading cost, these costs of trading into and out of a hedge position must be measured against its benefits. However, if already existing positions are kept for hedging purposes, trading costs are sunk costs. The present invention takes advantage of the hedging properties of already existing positions.

To trade out of an existing position, a stream of small tranches are placed and executed as limit orders in the market. This is illustrated in the flow diagram of FIG. 2. In step 201, a suitable tranche size is determined, e.g., from historic and/or current market data. A suitable tranche size should be big enough to achieve the desired execution speed, yet small enough not to reveal information to the market about the overall intentions (i.e., large tranche sizes would "scare" and "move the market" in an adverse fashion). In step 202, the size of the next tranche to be traded is determined as the smaller of the remaining position and the suitable tranche size. It is then determined, in step 203, if the next tranche should be placed in the market. Different constraints and limits might apply, e.g., volume constraints, time constraints, alpha constraints or the hedging constraints described below. If constraints apply, trading will be delayed for a period of time (step 204). In step 205, a limit order is placed in the market and "worked" until the order is fully executed. "Working" an order typically involves placing the order passively on bid or ask, and updating the order as the spread moves, or crossing the spread if it seems that a passive execution cannot be achieved within a reasonable period of time. Once the tranche is executed, the process begins again, in step 202, with determining the size of the next tranche to be traded.

In order to achieve a self hedging trade-out, the engine checks, in step 203, what effect the execution of the next tranche would have on the risk of the currently held unwind portfolio. This is done by calculating the Value at Risk ("VaR") for the two portfolios $P_c$ and $P_t$, where $P_c$ is the currently held position portfolio and $P_t$ is the current portfolio less the tranche to be traded. A tranche is only placed in the market if the risk in absolute (dollar) terms is reduced or equal, i.e. $VaR(P_t) \leq VaR(P_c)$, as a result of the trade-out. If the absolute risk increases, the tranche is not traded, but kept. Using a dollar denominated risk-measure insures that ultimately all positions are traded out of, which will be the case if small tranche sizes are chosen. Using a relative risk figure (which measures risk as a percentage of total portfolio holdings) could result in a dead-lock situation, where the positions are no longer taken off. To demonstrate a deadlock, assume a long position in stock A and a short position in stock B of $1000 each, with an absolute VaR of $20 or 1% in relative terms based on the gross book (i.e. $20/(|$1000|+|−$1000|) =1%). Assume further that reducing the position in stock A by $100 would result in a VaR of $19.9. In absolute terms, $19.9 is smaller than the original VaR of $20 and the tranche could thus be traded. In relative terms, however, the VaR of the new position would be $19.9/(|$900|+|−$1000|)=1.05%, i.e. the relative VaR increases as a result of trading this tranche. Using a relative VaR measure would prevent placing the tranche—the algorithm would be stuck. To calculate VaR figures, previous day's closing prices are used, to avoid the noise real-time prices would introduce into the calculation.

One or more of the foregoing steps may be implemented by software running on a data processing apparatus.

An exemplary trade-out is now described. Table 1 provides the assumptions used in this example. Table 2 indicates the account position in shares and absolute VaR at given times pursuant to this example.

TABLE 1

|  | Stock A | Stock B |
|---|---|---|
| Correlation coefficient |  | $\rho_{AB} = 0.6$ |
| Daily volatility | $\sigma_A = 1\%$ | $\sigma_B = 2\%$ |
| Previous day's close | $pr_A = \$10$ | $pr_B = \$10$ |
| Position in number of shares | $s_A$ | $s_B$ |
| Position values | $v_A = s_A \cdot pr_A$ | $v_B = s_B \cdot pr_B$ |
| Daily VaR of a portfolio of stocks A and B | $VaR = \sqrt{(v_A \cdot \sigma_A)^2 + (v_B \cdot \sigma_B)^2 + 2 \cdot v_A \cdot \sigma_A \cdot v_B \cdot \sigma_B \cdot \rho_{AB}}$ | |

TABLE 2

| | Account Position [shares] | | |
|---|---|---|---|
| Time | $s_A$ | $s_B$ | absolute VaR [$] |
| 09:10 | 1000 |  | $100.0 |
| 09:15 | 1000 |  | $100.0 |
| 09:17 | 700 |  | $70.0 |
| 09:20 | 700 | −900 | $148.9 |
| 09:23 | 700 | −900 | $148.9 |
| 09:30 | 700 | −400 | $67.7 |
| 09:35 | 400 | −400 | $64.5 |
| 09:40 | 400 | −400 | $64.5 |
| 09:41 | −200 | −400 | $93.4 |
| ... | ... | ... | ... |

At time 9:10, Market Maker ("MM") buys 1000 shares of stock A in a risk trade from a client and books these to the position-keeping system. The current bid-ask spread is $10.9-$11.0. The Engine ("E") picks up the new position. As it has not traded stock A on the given day, it starts by determining the suitable tranche size (i.e., step 201 of FIG. 2) to be 300 shares. Selling 300 shares of stock A will reduce the VaR to $70 (i.e., step 203 of FIG. 2). A tranche size of 300 shares is thus placed on the offer ($11) in the exchange via a limit order (i.e., step 205 of FIG. 2).

At time 9:15, the market moves down and the new bid-ask is ($10.80-$10.90). E lowers the price of its limit order to $10.90.

At time 9:17, the limit order is executed on the exchange. E tries to place the next tranche; however, a time constraint prevents it from doing so until 9:23. At this point, the account position, in number of shares of stock A, is 700 and the absolute VaR is $70.

At time 9:20, MM sells 900 shares of stock B in a risk trade to a client and books the trade. As stocks A and B are highly correlated, they hedge each other. E determines a suitable tranche size for stock B to be 500 shares. E places a bid for 500 shares in the exchange. At this point, the account position of shares of stock A is 700 and of stock B is −900. The absolute VaR is $148.9, using the formula set forth above in Table 1.

At time 9:23, E tries again to place a tranche in stock A. However, reducing the number of shares of stock A by 300 would result in an increase of VaR to $159.2. Thus, no tranche in stock A is placed.

At time 9:30, 500 shares of stock B are bought on exchange, thereby decreasing the account position in shares of stock B to −400. Due to time-constraints, E does not place another tranche of stock B in the exchange. At this point, selling 300 shares of stock A would reduce the VaR to $64.5. A tranche is thus placed on the exchange.

At time 9:35, 300 shares of stock A are sold on exchange. E places an order for 400 shares of stock B in the market, given that 400 is the lower of the suitable tranche size (500) and the remaining position (400). If the 400 shares were bought, the VaR would be reduced to $40.

At time 9:40, E places an order for 300 shares of stock A to sell in the market.

At time 9:41, MM sells 600 shares of stock A to a client. E pulls the sell order for 400 shares of stock A and, instead, sends a buy order for 200 shares of A to the exchange.

This form of trade out has a number of advantages over other trade-out schemes. Other schemes typically determine an optimized schedule before any trading starts. In connection with the present invention, however, all decisions are made ad-hoc and implicitly take into account any changes in the trade-out portfolio and market environment, which would normally render a pre-determined trade-out schedule useless.

What is claimed is:

1. A computer-readable storage medium comprising instructions which, when executed on a data processing apparatus, perform a method, the method comprising:
   (A) determining a suitable tranche size to be traded in a financial market;
   (B) determining a trade size of a tranche to trade in the financial market, the trade size of the tranche comprising a smaller of a size of a position in a financial instrument held by an entity and the suitable tranche size;
   (C) determining an effect of executing a tranche of a size comprising the trade size on an absolute dollar value of risk associated with a portfolio of the entity; and
   (D) placing the tranche in the financial market for execution if the absolute dollar value of risk remains the same or is reduced by executing the tranche.

2. The computer-readable storage medium of claim 1 wherein the suitable tranche size is determined based, at least in part, on a speed with which tranches of the financial instrument can be executed in the financial market.

3. A system comprising:
   a memory operable to store at least one program; and
   at least one processor communicatively coupled to the memory, in which the at least one program, when executed by the at least one processor, causes the at least one processor to:
   (i) determine a suitable tranche size to be traded in a financial market;
   (ii) determine a trade size of a tranche to trade in the financial market, the trade size of the tranche comprising a smaller of a size of a position in a financial instrument held by an entity and the suitable tranche size;
   (iii) determine an effect of executing a tranche of a size comprising the trade size on an absolute dollar value of risk associated with a portfolio of the entity; and
   (iv) place the tranche in the financial market for execution if the absolute dollar value of risk remains the same or is reduced by executing the tranche.

4. The system of claim 3 wherein the at least one processor is further caused to:
   maintain information regarding the position.

5. The system of claim 3 wherein the suitable tranche size is determined based, at least in part, on a speed with which tranches of the financial instrument can be executed in the financial market.

* * * * *